(No Model.) 6 Sheets—Sheet 1.
J. MERRITT & W. E. SPENCER.
PHOTOGRAPHIC CAMERA.
No. 426,295. Patented Apr. 22, 1890.
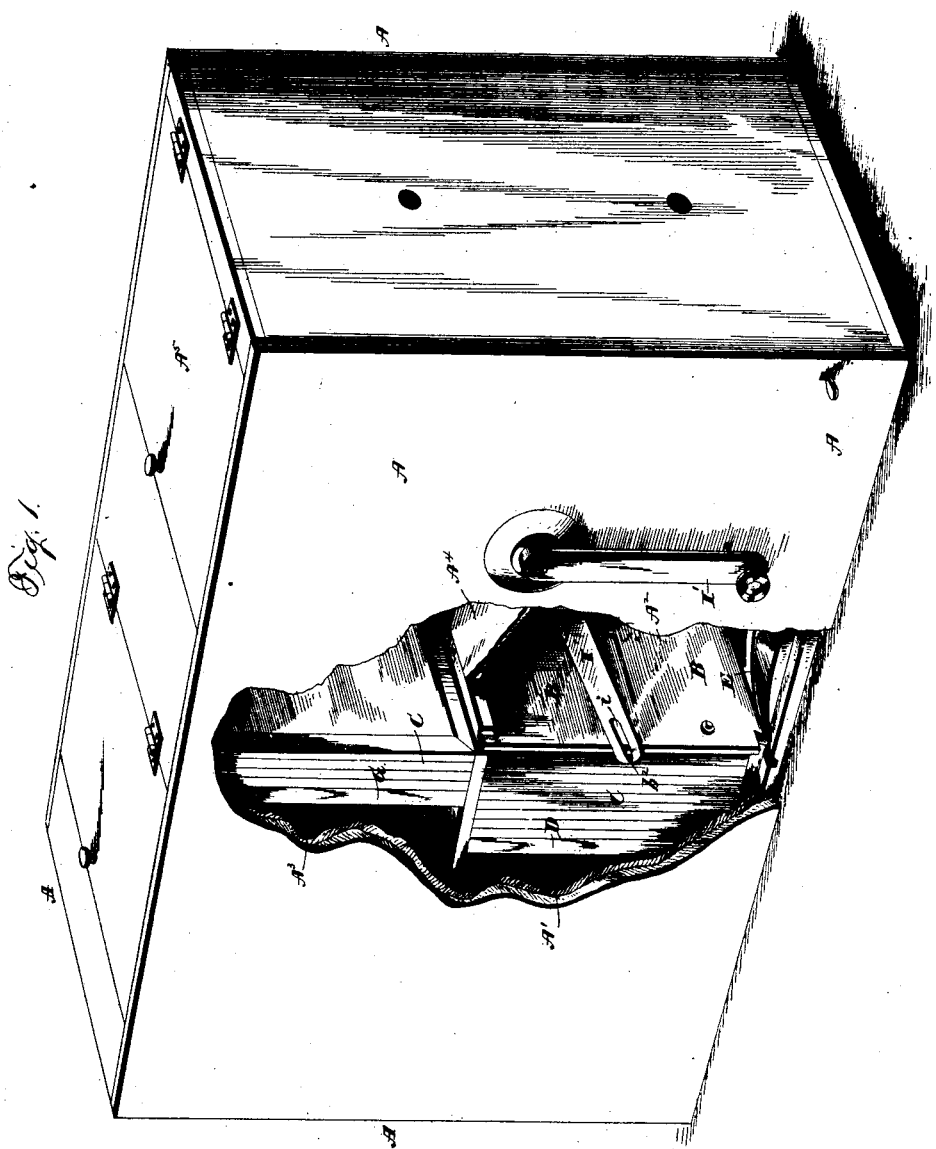
Witnesses
Chas. J. Williamson
Henry C. Hazard
Inventors
Jno. Merritt and Wm. E. Spencer, by
Crindle and Russell, their Attys (No Model.) 6 Sheets—Sheet 2.
J. MERRITT & W. E. SPENCER.
PHOTOGRAPHIC CAMERA.
No. 426,295. Patented Apr. 22, 1890.
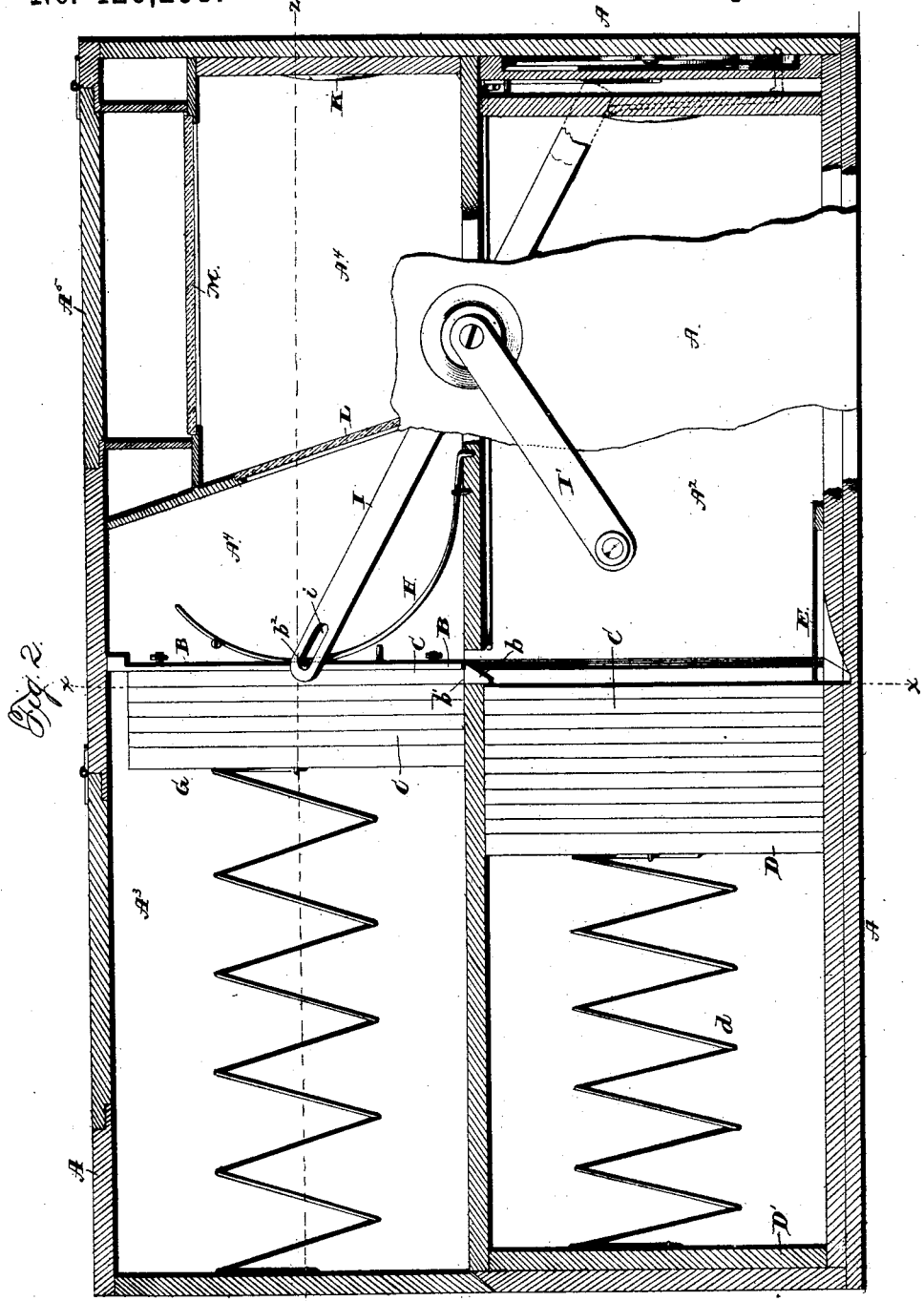

(No Model.) 6 Sheets—Sheet 3.
J. MERRITT & W. E. SPENCER.
PHOTOGRAPHIC CAMERA.
No. 426,295. Patented Apr. 22, 1890.
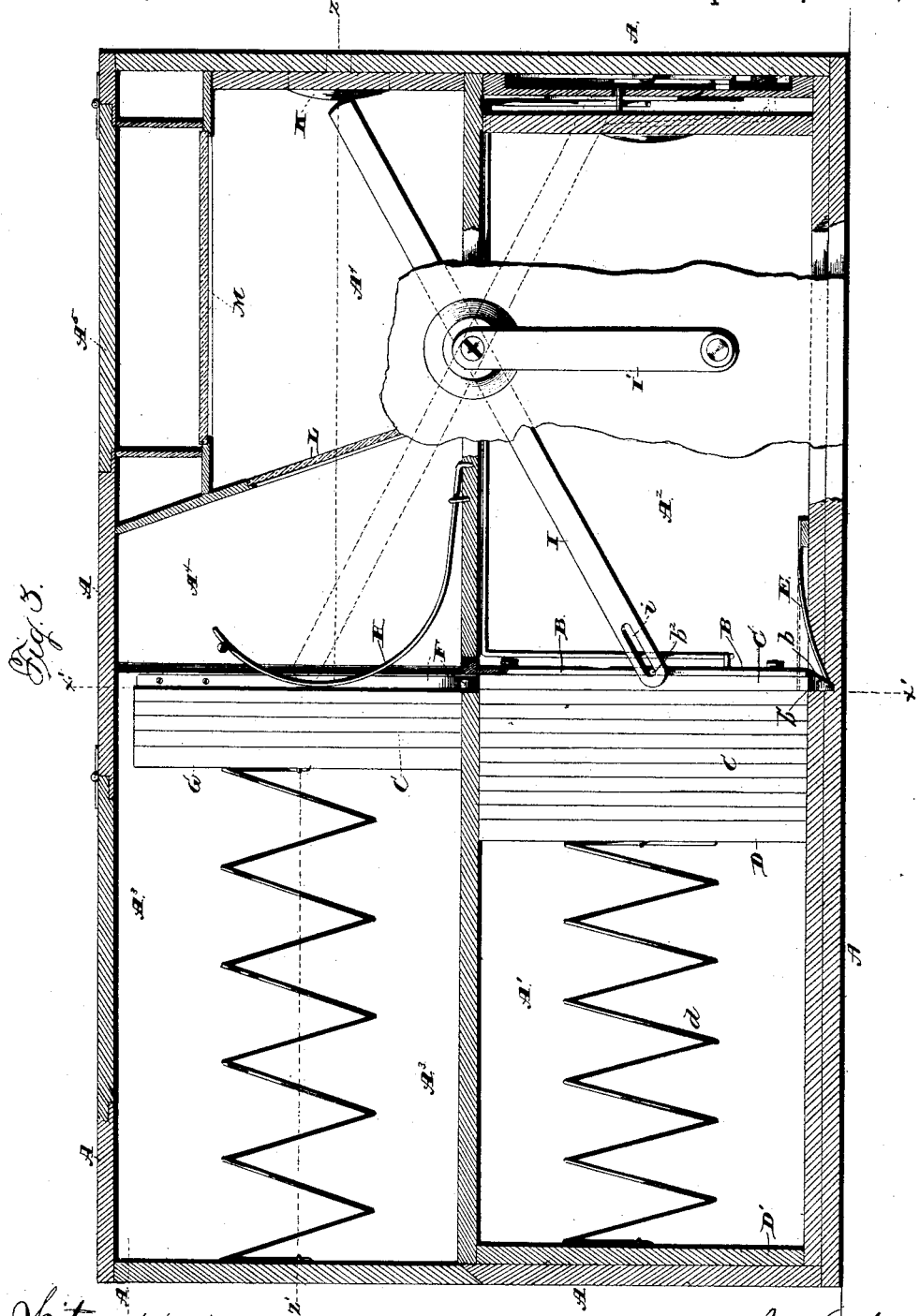
Witnesses
Chas. Williamson
Henry C. Hazard
Inventors
Jno. Merritt and Wm. E. Spencer, by
Dindle and Russell, their Attys (No Model.) 6 Sheets—Sheet 4.
J. MERRITT & W. E. SPENCER.
PHOTOGRAPHIC CAMERA.
No. 426,295. Patented Apr. 22, 1890.
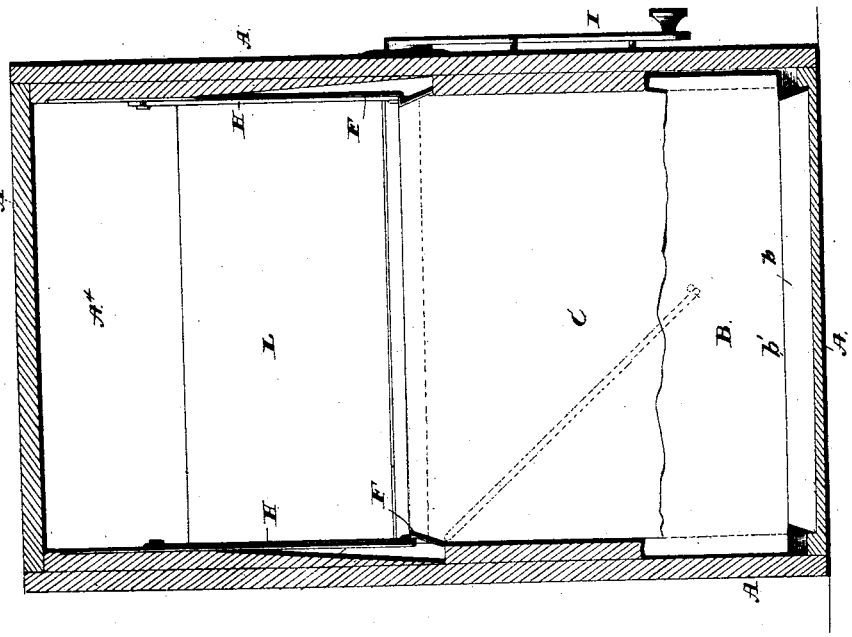
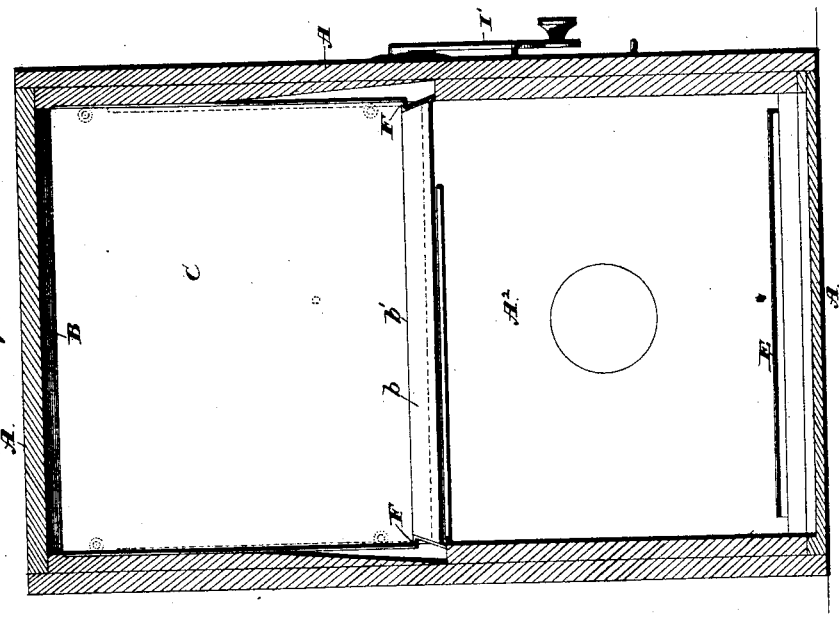
Witnesses
Chas. J. Williamson
Henry C. Hazard
Inventors
Jno. Merritt & Wm. E. Spencer
Crindle & Russell, their Attys (No Model.)  6 Sheets—Sheet 5.
J. MERRITT & W. E. SPENCER.
PHOTOGRAPHIC CAMERA.
No. 426,295. Patented Apr. 22, 1890.
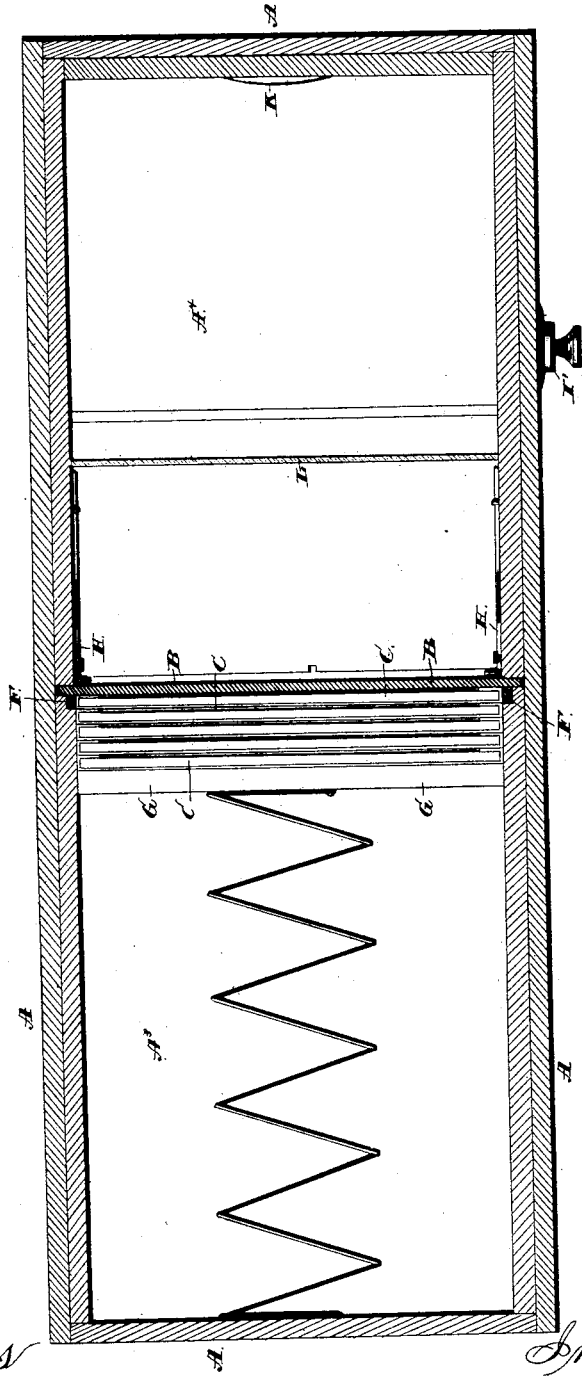

(No Model.) 6 Sheets—Sheet 6.
J. MERRITT & W. E. SPENCER.
PHOTOGRAPHIC CAMERA.
No. 426,295. Patented Apr. 22, 1890.
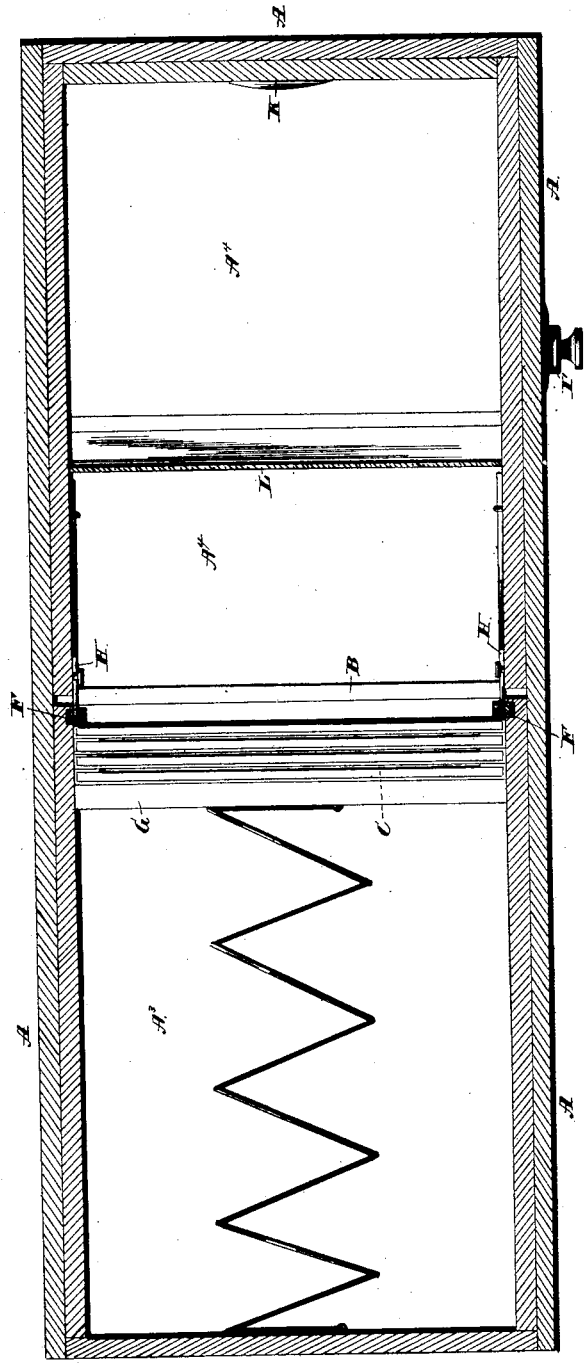
Witnesses
Chas. J. Williamson
Henry C. Hazard
Inventors
Jas. Merritt and Wm. E. Spencer, by
Prindle & Russell, their Attys

UNITED STATES PATENT OFFICE.

JOHN MERRITT AND WILLIAM E. SPENCER, OF BROOKLYN, NEW YORK.

PHOTOGRAPHIC CAMERA.

SPECIFICATION forming part of Letters Patent No. 426,295, dated April 22, 1890.

Application filed March 9, 1889. Serial No. 302,596. (No model.)

*To all whom it may concern:*

Be it known that we, JOHN MERRITT and WILLIAM E. SPENCER, of Brooklyn, in the county of Kings, and in the State of New York, have invented certain new and useful Improvements in Photographic Cameras; and we do hereby declare that the following is a full, clear, and exact description thereof, reference being had to the accompanying drawings, in which—

Figure 1 is a perspective view of our camera from the front, a portion of the side wall of the casing being removed to show the interior arrangement of parts. Figs. 2 and 3 are side elevations of the same, the side wall being entirely removed, and show, respectively, the relative positions of parts when the carrier is at the upper and lower limits of its motion. Figs. 4 and 5 are vertical sections upon lines $x\ x$ and $x'\ x'$, respectively, of Figs. 2 and 3; and Figs. 6 and 7 are horizontal sections upon lines $z\ z$ and $z'\ z'$, respectively, of Figs. 2 and 3.

Letters of like name and kind refer to like parts in each of the figures.

The object of our invention is to render more efficient and easy of manipulation cameras intended for instantaneous photography; and such invention consists in a camera, and the parts thereof constructed and operating as hereinafter specified and claimed.

In the carrying of our invention into practice we provide a casing A, which has about twice the height and length of a single-plate camera, and is interiorly divided into four substantially equal spaces or compartments, of which the lower rear compartment A' is for the storage of prepared plates, the lower front compartment $A^2$ is for the exposure of such plates, the upper rear compartment $A^3$ is for the storage of plates that have been exposed, and the upper front compartment $A^4$ is for finder mechanism, as hereinafter described.

The exposure-compartment $A^2$ is provided at its front end with the usual light-aperture lens, and with mechanism for opening and closing such aperture, while at its rear end is a carrier B, that substantially fills the space laterally and vertically, and is adapted to be moved vertically within suitable side grooves, so as to occupy either of the positions shown in Figs. 2 and 3. At the lower end of said carrier is secured a strip $b$, that extends horizontally across the same, and at its front side has a downward and rearward inclination, while the rear side of said strip is vertical and its top forms a ledge $b'$, which corresponds substantially in width to the thickness of a plate-holder C. When said carrier is at the lower limit of its motion, said ledge is flush with the bottom of the lower rear compartment A', and when said carrier is at the upper limit of its motion said ledge is in like manner flush with the bottom of the upper rear compartment $A^3$.

As before stated, the lower rear compartment A' is for the storage of prepared plates in their holders C and C, and the same are inserted from the rear end and are then held with a yielding pressure at the front end of such compartment by means of a follower D, that is pressed against such holders by a spring $d$, which extends between the same and a correspondingly-shaped block D'.

Before the prepared plates are inserted into their compartment A' the carrier B is raised to the upper limit of its motion, when, as seen in Fig. 2, the strip $b$ projects sufficiently below the top of said compartment to enable it to form an abutment, against which rests the upper edge of the innermost holder C. The lower edge of said holder is engaged by two or more springs E and E, which are secured at one end upon the bottom of the exposure-compartment $A^2$, and from thence project rearward, as shown.

After a plate has been exposed the carrier B is moved downward to the position shown in Fig. 3, and presses the springs E and E downward until just as said carrier reaches the lower limit of its motion the contiguous plate-holder C is pressed forward over the ledge $b'$. If now said carrier is raised, it will carry with it the holder C and its plate, while said springs E and E will resume their normal positions and engage with the lower edge of the plate-holder next in rear. When the carrier B reaches the upper limit of its motion, the plate-holder C has its side edges grasped by two inwardly-pressing springs F and F, that are secured upon or within the sides of the casing A, which springs confine the holder in place when said carrier again descends. After the carrier B is moved downward to the position shown in Fig. 3 the plate-holder C is moved rearward into the upper rear compartment A³, against a yielding abutment G, by means of two springs H and H, such operation being repeated each time that another plate-holder is raised to position.

The carrier B is preferably moved upward and downward by means of a lever I, which at one end is pivoted upon or within one of the sides of the casing A, and at its opposite end is provided with a longitudinal slot $i$, that engages with a stud $b^2$ upon one side edge of said carrier. A crank-arm I', secured to the pivotal end of said lever and located upon the outside of said casing, enables the desired movements to be readily effected by the hand of the operator. The shutter opening and closing mechanism is preferably connected with and operated by said carrier, so that light is admitted to the exposure-compartment at the instant that said carrier reaches the upper limit of its motion, and is instantly excluded from said compartment when said carrier commences to move downward.

The "finding" mechanism consists of a lens K, which is placed within the front end of the upper front compartment A, a mirror L, that is placed near the rear end of said compartment, with its face inclining rearward and upward at an angle of about forty-five degrees to the focal axis of said lens, and a ground-glass plate M, which is placed horizontally near the upper side of said compartment in front of said mirror, the relative arrangement of parts being such as to cause light passing through said lens to be reflected upon said glass plate. A hinged cover A⁵, immediately above said plate M, may be raised by the operator, and enables him to see the image reflected upon the latter.

Although we have shown and described in this application the spring devices E for holding plates in the storage-compartment during the elevation of the carrier, and devices by which the operation of the exposing mechanism may be effected automatically by the operation of the device for causing the movements of the plate-carrier, and devices for automatically retaining a plate when elevated and then removing it into the storage-compartment, such we do not claim, broadly, herein, as the same are covered in an application filed by us simultaneously herewith, the serial number of which is 302,597.

Having thus described our invention, what we claim is—

1. A camera which is provided with a compartment for the storage of prepared plates, a compartment in front of the same for the exposure of prepared plates, and an upper compartment for the storage of exposed plates, in combination with means whereby each plate after exposure may be directly raised to and placed within the upper storage-compartment, and means to automatically move each plate after being raised out of the path of a successively-moved plate before the upward movement of the latter, substantially as and for the purpose specified.

2. A camera which is provided with a compartment for the storage of prepared plates, a compartment for the exposure of prepared plates, and a shutter, in combination with means whereby the removal of an exposed plate and the operation of the shutter may be simultaneously and automatically effected, substantially as and for the purpose set forth.

3. A camera which is provided with a compartment for the exposure of prepared plates, a compartment for the storage of exposed plates, and a shutter, in combination with a carrier adapted to carry plates from the former to the latter compartment, and a lever engaging with said carrier and said shutter, whereby the removal of an exposed plate and the operation of said shutter to effect the exposure of another plate may be simultaneously effected, substantially as and for the purpose shown.

4. A camera which is provided with a compartment for the exposure of prepared plates and a compartment for the storage of exposed plates, in combination with a carrier adapted to transfer plates from the former to the latter compartment, and a pivoted lever engaging with the carrier to effect its operation, substantially as and for the purpose shown and described.

5. A camera which is provided with plate-exposure and plate-storage compartments, in combination with a carrier adapted to effect the removal of plates from the former to the latter compartment, a lever within the camera-casing engaging with such carrier, and a crank-arm without the camera-casing engaging with such lever, substantially as and for the purpose specified.

6. A camera which is provided with a plate-holding compartment, a compartment for the exposure of plates, a shutter, and mechanism whereby the removal of an exposed plate and the operation of the shutter may be automatically effected, in combination with a finder mechanism that is adapted to adjust the camera so as to bring the object to be photographed within the field of the lens, substantially as and for the purpose shown.

In testimony that we claim the foregoing we have hereunto set our hands this 20th day of February, 1889.

JOHN MERRITT.
WM. E. SPENCER.

Witnesses:
JNO. H. KANE,
E. H. QUANTIN,